United States Patent
Warner et al.

(10) Patent No.: US 7,656,945 B1
(45) Date of Patent: Feb. 2, 2010

(54) STABILIZED DIGITAL TIMING RECOVERY USING LOW-COMPLEXITY EQUALIZER

(75) Inventors: William D. Warner, Maple Ridge (CA); Paul V. Yee, Vancouver (CA)

(73) Assignee: PMC-Sierra, Inc., Santa Clara, CA (US)

( * ) Notice: Subject to any disclaimer, the term of this patent is extended or adjusted under 35 U.S.C. 154(b) by 554 days.

(21) Appl. No.: 11/538,346

(22) Filed: Oct. 3, 2006

Related U.S. Application Data

(60) Provisional application No. 60/723,552, filed on Oct. 4, 2005.

(51) Int. Cl.
   *H03H 7/40* (2006.01)
(52) U.S. Cl. .................. 375/233; 375/344; 375/350; 375/355; 455/182.2; 455/192.2; 455/307
(58) Field of Classification Search ............ 375/229, 375/230, 232, 233, 344, 350, 355; 455/182.1, 455/182.2, 192.1, 192.2, 307, 63.1, 67.13
   See application file for complete search history.

(56) References Cited

U.S. PATENT DOCUMENTS

| | | | | |
|---|---|---|---|---|
| 5,471,508 | A * | 11/1995 | Koslov | ..................... 375/344 |
| 5,818,655 | A | 10/1998 | Satoh et al. | |
| 5,999,355 | A | 12/1999 | Behrens et al. | |
| 6,438,163 | B1 * | 8/2002 | Raghavan et al. | ........... 375/233 |
| 6,614,841 | B1 * | 9/2003 | Ohta | ......................... 375/232 |
| 6,804,695 | B1 | 10/2004 | Hsu | |
| 6,891,910 | B2 * | 5/2005 | Hwang et al. | ............... 375/355 |
| 7,254,198 | B1 * | 8/2007 | Manickam et al. | ......... 375/348 |
| 7,505,537 | B1 * | 3/2009 | Sutardja | ..................... 375/345 |

OTHER PUBLICATIONS

Mathew, et al; A Novel Interpolation Approach for Reducing Clock-Rate in Multilevel Decision Feedback Equalization Detectors; Institute of Electrical and Electronics Engineers (IEEE) Transactions on Magnetics; Sep. 2000; pp. 3866-3878; vol. 36, No. 5; Institute of Electrical and Electronics Engineers (IEEE).

Abbott, et al; Timing Recovery for Adaptive Decision Feedback Equalization of the Magnetic Storage Channel; 1990; pp. 1794-1799; 901.6.1; Institute of Electrical and Electronics Engineers (IEEE).

Siller, Jr., et al; Decision-Directed Fractionally Spaced Equalizer Control Using Time-Domain Interpolation; Institute of Electrical and Electronics Engineers (IEEE) Transactions on Communications; Feb. 1991; pp. 182-186; vol. 39, No. 2; Institute of Electrical and Electronics Engineers (IEEE).

(Continued)

*Primary Examiner*—Dac V Ha
(74) *Attorney, Agent, or Firm*—Knobbe Martens Olson & Bear LLP

(57) ABSTRACT

A low-complexity digital linear equalizer whose operation and adaptation makes stabilized digital timing recovery practical. The technique is fundamental for the operation of communications receivers employing digital timing recovery, e.g., in a modem. A technique for automatically adjusting the parameters of a digital linear equalizer to compensate for low-pass impairments while maintaining a relatively constant timing characteristic is described.

22 Claims, 9 Drawing Sheets

OTHER PUBLICATIONS

Coker, et al; Implementation of PRML in a Rigid Disk Drive; Institute of Electrical and Electronics Engineers (IEEE) Transactions on Magnetics; Nov. 1991; pp. 4538-4543; vol. 27, No. 6; Institute of Electrical and Electronics Engineers (IEEE).

Gysel, et al; Timing Recovery in High Bit-Rate Transmission Systems over Copper Pairs; Institute of Electrical and Electronics Engineers (IEEE) Transactions on Communications; Dec. 1998; pp. 1583-1586; vol. 46, No. 12; Institute of Electrical and Electronics Engineers (IEEE).

* cited by examiner

STABILIZED DIGITAL TIMING RECOVERY USING LOW-COMPLEXITY EQUALIZER

CROSS-REFERENCE TO RELATED APPLICATION

This application claims the benefit under 35 U.S.C. §119 (e) of U.S. Provisional Application No. 60/723,552, filed Oct. 4, 2005, the entirety of which is hereby incorporated by reference.

BACKGROUND

1. Field of the Invention

This invention is applicable to any digital communications receiver utilizing digital time domain timing recovery in conjunction with digital equalization. It can be used with band-limited RZ-rate sampled RZ signals, twice oversampled NRZ signals, and arbitrary signals with low-pass or bandpass channel impairment.

2. Description of Related Art

Fundamental to the operation of a digital communications receiver is the conversion of its incoming received waveform from continuous time to representative samples at discrete time instances. It is well-known in the art that if the sampling rate is sufficiently high relative to the finite bandwidth of the received waveform, it and the discrete time sample sequence (henceforth referred to as the "digital signal") can be considered equivalent, in the sense that one can be reconstructed from the other by a series of well-defined mathematical operations. On the other hand, it is often desirable for receiver power efficiency and complexity to sample at or below the minimum rate permissible for reconstruction of the received waveform from its discrete time sample sequence. In such cases, the performance of the digital receiver (as measured by the error rate in recovering the transmitted data) can be strongly dependent on the sampling time instances, i.e., there exist relatively good, such as optimal, choices for the sampling instances. These relatively good sampling instances may not be a fixed pattern in time, i.e., periodic, depending upon the type of distortion the data-bearing waveform undergoes after transmission through the channel to the receiver. For example, the transmitted waveform can suffer from time-varying delay as well as fixed delay and phase distortion as it is transmitted over the channel to the receiver. This time-varying delay manifests itself as jitter while the time-varying phase results in frequency offset, both of which can be highly detrimental to the performance of the receiver. "Timing recovery" refers to the process of instantaneously adjusting the received waveform sampling instances for better or relatively good receiver performance. In a digital communications receiver, this timing adjustment can occur at various points within the signal processing path, e.g., at an analog-to-digital converter (ADC) or at a delay line.

In cases where the transmitter has embedded timing information, e.g., timing beacons or pilots, into the transmitted waveform, timing recovery can be relatively straightforward if the timing information can be reliably extracted and processed at the receiver. Such an approach, however, typically incurs overhead in terms of the data transmission rate, so communications systems often use data-bearing waveforms without explicitly embedded timing information. For these cases, the receiver recovers the correct timing from the received waveforms without prior knowledge of the transmitted data. The subject matter of this disclosure pertains to this class of timing recovery techniques.

The problem of timing recovery is exacerbated in the presence of standard linear impairments such as frequency-dependent amplitude and phase variation, i.e., the channel response. It is well-known in the art that it is significantly advantageous to perform timing recovery on the received waveform after these standard linear impairments are compensated, e.g., by a linear equalizer. Otherwise, the time-domain intersymbol interference manifested between consecutive data pulses in the received waveform (due to the channel response) results in low performance for many timing recovery techniques. When the channel response to be equalized is not known a priori or is time-varying, adaptive equalizers are often employed to compensate the channel response. In the context of digital communications systems with sampled waveforms, such an adaptive equalizer comprises a number of coefficients which it adaptively adjusts repeatedly to reduce or minimize some error criteria, e.g., the mean-square error between the equalizer output samples and the corresponding decoded data symbols. Linear impairments can be adequately compensated by linear equalizers which can be divided into two main classes: infinite and finite impulse response (IIR and FIR equalizers, respectively). Both classes of equalizers are capable of adaptively compensating the standard linear impairments of a channel and, as such, can be considered candidates for adaptive equalization of the received digital signal prior to timing recovery. Unfortunately, operating a linear adaptive equalizer simultaneously in series with a timing recovery apparatus can be relatively difficult due to the interaction between the group delay characteristic of the equalizer and the subsequent timing adjustment computed by the timing recovery apparatus.

In recognition of the problems posed by operating a timing recovery apparatus on the equalized output of a linear adaptive equalizer, works in the current state of the art typically attempt to coordinate the adaptation of the equalizer with the timing adjustment imparted by the timing recovery apparatus. One technique is to either adapt the equalizer or adjust the timing by the timing recovery apparatus but not simultaneously. A straightforward generalization of this technique is to ensure that the timing adjustment process of the timing recovery apparatus operates and adjusts timing much faster than the group delay characteristic of the equalizer updates. Another general class of techniques attempts to constrain the equalizer adaptation or coefficients in some fashion to fix its group delay characteristic. For all these techniques, empirical evidence is offered to demonstrate their efficacy but the ultimate ability of proposed techniques to prevent the interaction between the timing correction of the linear equalizer and that from the timing recovery apparatus is not or cannot be proven by design. Indeed, those skilled in the art will acknowledge that, even with these techniques, the group delay characteristic of the linear adaptive equalizer and the timing adjustment of the timing recovery apparatus can both drift imperceptibly slowly in opposite directions such that the serial combination of the equalizer and timing recovery apparatus appears to have a fixed delay. Given sufficient time for the linear equalizer and timing recovery apparatus to adapt and operate, however, it has been observed that these opposing timing drifts can lead to a condition in which both may realize excessive time delays which compromise overall system performance. A specific example is the case where the linear equalizer is a FIR filter with a limited number of coefficients. As the timing adjustment of the timing recovery apparatus drifts in one direction, the FIR filter compensates by inducing a proportionately opposite drift which uses a similar shift or delay in its coefficients. For example, a one sample delay in the FIR filter (with other frequency characteristics held constant) is realized approximately by shifting a zero coefficient to become the filter's first coefficient, the first coefficient to become the second one, the second coefficient to becomes the third one, etc (a one sample advance is similar). It is straightforward to see that if this timing drift continues unabated, the equalizer loses progressively its ability to compensate the channel response as its filter coefficients are truncated successively to zero. On the other hand, the timing recovery apparatus outputs a timing adjustment whose magnitude is ever increasing, to the point that the timing adjustment range of the ADC, e.g., is exceeded. Clearly, this operational condition would be undesirable. One improvement on the state of the art for embodiments disclosed herein is an immunity to this timing interaction between the linear adaptive equalizer and the timing recovery apparatus. This immunity is fundamental in the sense that it is assured from first principles as opposed to merely by simulation evidence.

The following publications are representative of the current state of the art for timing recovery methods operating with adaptive equalizers: (1) Coker, R. et al. Implementation of PRML in a Rigid Disk Drive, IEEE Transactions on Magnetics, Vol. 27, No. 6, November 1991, pgs 4538-4543; (2) Gysel, P. and Gilg, D. Timing Recovery in High Bit-Rate Transmission Systems Over Copper Pairs, IEEE Transactions on Communications, Vol. 46, No. 12, December 1998, pgs 1583-1586; (3) U.S. Pat. No. 5,818,655; (4) U.S. Pat. No. 5,999,355; and (5) U.S. Pat. No. 6,804,695.

These works propose various techniques to either decouple or constrain the adaptation of the coefficients of the equalizer with respect to the timing adjustments imparted by the timing recovery apparatus. A representative example of the former class of techniques is described in Gysel and Gilg, where the timing recovery entity is allowed to modify the input timing of the linear adaptive equalizer only when the latter is not adapting, i.e., is frozen. Similarly, the equalizer adapts only when its input timing as determined by the timing recovery entity is held constant. While the technique is described using a single iteration between the timing adjustment from the timing recovery entity and the adaptation of the equalizer, those skilled in the art will recognize that even repeated cycling between the two operational modes can result in inherently suboptimal overall timing adjustment (comprising the serial combination of the timing adjustment from the timing recovery entity and the group delay response of the adapted equalizer) compared to one in which both the equalizer and the timing recovery entity are allowed to modify (simultaneously) their respective parameters.

In the second class of techniques, Coker et al. propose a method to constrain the adaptive equalizer be a three coefficient FIR filter with a fixed "centre" coefficient and symmetric "side" (real) coefficients, i.e., h is of the form $h=[a, b, a]^T$. With these constraints, the resultant equalizer response is guaranteed (by design) to have linear phase and uniform (zero) group delay over the sampling frequency range. Unfortunately, the effective limitation to two adaptive coefficients and rigid flat group delay response constraint render the equalizer insufficiently flexible in many applications to provide adequate performance, although the timing interaction with any timing recovery entity is inherently minimized by this design. The apparatus described in U.S. Pat. No. 5,818,655 extends this method to the general multicoefficient case where the FIR filter equalizer adaptation is constrained to produce only symmetric coefficients, resulting in a flat equalizer group delay response and the same advantages/disadvantages with respect to equalization performance vs. timing stability. Recognizing that requiring a flat equalizer group delay over the entire sampling bandwidth can overly constrain the gain and phase equalization performance of the adaptive equalizer, U.S. Pat. No. 5,999,355 proposes a method to "anchor", i.e., fix, the equalizer gain and phase response at a single frequency (the extension to multiple gain and phase constraints at multiple frequencies is readily apparent to those skilled in the art). For example, this single anchor frequency can be chosen intuitively to coincide with the spectral peak of the expected equalizer input signal. The motivation behind this technique is clear, in that it is expected that the equalizer can perform better when it is afforded greater flexibility to shape its phase/group delay response around the anchor frequency. Nonetheless, those skilled in the art will recognize that a single (or even multiple) frequency constraint(s) on the adaptive equalizer gain or phase response does not, by design, guarantee that the corresponding group delay response will not interact with the recovered timing signal from the timing recovery entity as previously described. Indeed, it is simple to construct realistic examples of signals and channels (such as a low-pass cable model) for which the adaptive equalizer will modify slowly its group delay response around the anchor frequency in such a way as to induce a steady drift in the timing recovery signal from the timing recovery entity. Thus, the technique described in U.S. Pat. No. 5,999,355 does not adequately address the fundamental problem of timing interaction between a timing recovery entity and a linear adaptive equalizer when the former modifies the input timing of the latter as a result of examining the latter's output.

SUMMARY

Embodiments of the invention improve the timing interaction between a timing recovery entity and a linear adaptive equalizer. In conventional devices, adjustments to timing of the timing recovery entity can affect the timing of the linear adaptive equalizer, and vice versa.

Methods and apparatus are described for operating and adapting a digital linear equalizer to compensate for impairments induced by a low-pass communications channel. The operation method permits such compensation with relatively few resources while the adaptation method allows the continuous refinement and improvement of the equalizer's performance with provably stable timing characteristics. This aspect is useful for operation within a digital timing recovery apparatus where timing recovery is performed on equalized data (instead of unequalized data) to improve the quality of the recovered timing. Embodiments of the invention can be employed with any type of apparatus using or benefiting from the equalization of low-pass impairments in a signal without affecting the signal timing. In particular, embodiments of this invention can be employed in any digital timing recovery apparatus that uses the following operation. An input signal from which timing is to be recovered is equalized. The equalized output is then processed by a timing recovery entity which extracts an estimate of the timing information embedded in the equalized signal. The estimated timing is then conveyed to a timing control entity which responds by adjusting the timing of the input signal. The timing adjustment occurs continuously to achieve relatively good performance for subsequent apparatus which utilizes the equalized output. In particular, the equalizer can be followed by a decision apparatus that maps the equalizer output to data symbols, in which case the timing recovery entity would attempt to adjust the signal timing to minimize the difference between the equalizer outputs and the corresponding mapped data symbols.

This disclosure describes methods of implementing a low-complexity digital linear equalizer whose operation and adaptation makes stabilized digital timing recovery practical. The technique is fundamental for the operation of communications receivers employing digital timing recovery, e.g., in a modem. This document discloses a technique for automatically adjusting the parameters of a digital linear equalizer to compensate for low-pass impairments while maintaining a relatively constant timing characteristic. The technique disclosed is useful to the practical design of digital timing recovery apparatus in communications receivers.

BRIEF DESCRIPTION OF THE DRAWINGS

These drawings and the associated description herein are provided to illustrate specific embodiments of the invention and are not intended to be limiting.

DETAILED DESCRIPTION OF PREFERRED EMBODIMENTS

Figure 1:
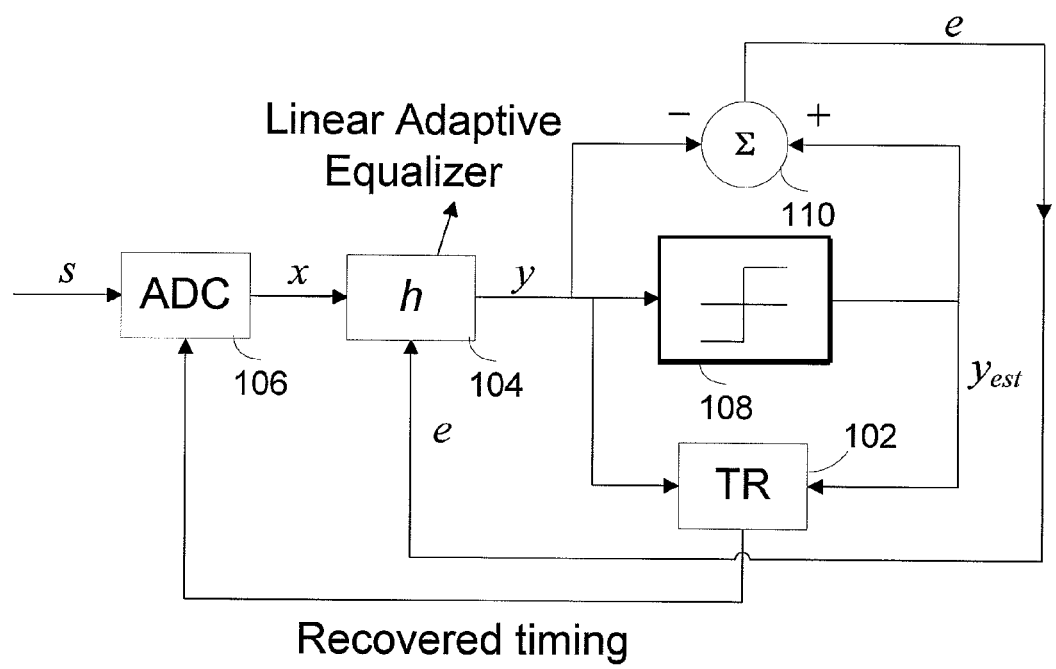
FIG. 1 illustrates an embodiment of a timing recovery apparatus operating from output of a linear adaptive equalizer.

FIG. 1 illustrates a typical system in which a timing recovery (TR) apparatus 102 has been embedded. In accordance with the advantages described previously for recovering timing from equalized data, the TR block 102 compares the output y of the linear adaptive equalizer h 104 with the corresponding symbol $y_{est}$ decoded by the decision device 108 (denoted by a step function) to recover a timing signal which is fed back to adjust the sample timing of the ADC 106. At the same time, the coefficients h of the linear adaptive equalizer 104 are adjusted to reduce, such as minimize, some measure of the error e between the equalizer output y and the decoded symbol $y_{est}$.

The arrangement shown in FIG. 1 illustrates the problematic interaction that can occur in the conventional art between the timing recovered from the TR entity 102 and the group delay response of the linear adaptive equalizer 104. Assuming that the system has settled to a stable state with relatively good, such as optimal recovered timing, in which the decoding error e is, on average, zero so that the linear adaptive equalizer coefficients h are approximately fixed with a small amount of residual adaptation variance or "noise". Due to this variance in e, the TR entity 102 can, on occasion, examine its inputs and decide to modify slightly the recovered timing signal to the ADC 106. For example, consider the case where the TR entity 102 decides to advance the equalizer input signal x(t) by a small amount d (relative to s(t)), i.e., x(t)→x(t+d). By the linearity of the adaptive equalizer 104, this timing advance is reflected directly in the equalizer output y, i.e., y(t)→y(t+d). If the timing advance d is small, the decision device 108 decodes the same symbol $y_{est}(t)$ as before the timing advance, hence the error e(t) will reflect this timing advance. The input symbols for the slicer 108 are also referred to as soft symbols, and the output symbols are referred to as hard symbols. The linear adaptive equalizer 104 then adjusts its coefficients h to reduce this error e(t) by modifying its group delay characteristic to introduce an equal but opposite delay d to cancel the timing advance and return to the previously relatively good or optimal recovered timing. Thus, the system settles to a new timing state in which the timing recovery signal and the equalizer group delay characteristic are perturbed in equal but opposite directions from their original stable values such that the overall timing of the equalizer output, decoded symbol and decoder error remain unchanged (on average). It is straightforward to see that this multiplicity of equivalent system timing states implies that this timing perturbation process can be repeated ad infinitum, with the timing recovery signal and the equalizer group delay characteristic diverging from their original stable values. In principle, this timing divergence is in itself not problematic except in the face of the following real-world constraints: the linear adaptive equalizer is a FIR filter with a finite number of coefficients: and the ADC or other timing control mechanism has a finite input, i.e., time adjustment, range.

The linear adaptive equalizer 104 can be implemented by a finite impulse response (FIR) filter with a finite number of coefficients. The maximum group delay possible with a finite length FIR filter is equal to one less than the number of coefficients. Representing a FIR filter of length N as a row vector of coefficients indexed from 0 to N–1, one can increase its group delay by one sample for a given amplitude response by simply "shifting" its coefficients by one position "to the right", i.e., the coefficients at indices 0 to N–2 are copied into indices 1 to N–1. The value of the first, i.e., zeroth, coefficient then depends on the nature of the linear impairment being equalized. In many practical cases, e.g., a low-pass cable or transmission line, the impairment can be described by an all-poles infinite impulse response (IIR) filter, for which the ideal channel equalizer is a FIR filter with a finite number of (nonzero) pre and postcursor coefficients. When properly adapted, the linear adaptive equalizer captures a contiguous subset or window of coefficients from the vector of ideal channel equalizer coefficients. After a shift "to the right", the zeroth coefficient is then the first coefficient of the ideal channel equalizer outside of the window of coefficients captured by the linear adaptive equalizer, i.e., the window of ideal equalizer coefficients captured by the linear adaptive equalizer shifts to the "left" by one coefficient. Should this group delay continue to increase, the linear adaptive equalizer coefficients are successively driven to zero as the capture window slides "left" over the ideal coefficient vector until its nonzero precursor coefficients are exhausted. In the art, this situation is recognized to be clearly undesirable as the zero coefficients introduced into the linear adaptive FIR filter for the sake of additional delay are generally detrimental to equalizer performance.

The ADC 106 or other timing control mechanism has a finite input, i.e., time adjustment, range. Practical devices such as an ADC 106 may have a finite timing adjustment range that can be approached or exceeded when the recovered timing signal computed by the TR entity 102 diverges as described previously. For such a case, the ADC 106 or other timing control mechanism saturates at its maximum permissible delay, an operating point that can result in marginal performance.

There exists a need in the art for a technique to operate a timing recovery entity from adaptively equalized data without deleterious effects on timing stability and equalizer performance.

The timing recovery entity 102 (denoted "TR") recovers a timing control signal from the output of a linear adaptive equalizer 104 to control the input sample timing at the ADC 106. As will be described herein and will be understood to those versed in the art, the use of a linear adaptive equalizer 104 in this description is purely illustrative and does not imply any limitation to the applicability of the technique to other more general equalizers. Similarly, the operation of the TR entity 102 from the equalizer output and the decision device output is not intended to be restrictive in any sense. One aspect of the invention is the careful a priori choice of the form of the coefficients in the linear adaptive equalizer h. With this choice, it can be shown from first principles that the resulting adaptive equalizer group delay characteristic remains stable (in a precise sense to be defined further on) in the presence of adjustments to the recovered timing control signal into the ADC 106 by the TR entity 102. Unlike the prior art, disclosed techniques therefore allow simultaneous adaptation of the equalizer 104 and timing adjustment from the TR entity 102 to occur such that the overall timing of the receiver from input to output is stabilized. Although described (for simplicity) for the minimal case where the equalizer comprises a FIR filter with three coefficients, the scope of the invention includes, but is not limited to, a priori choices of the form of the coefficients achieving the same stabilized timing recovery for FIR equalizers of odd length greater than three. In the same vein, the scope of the invention further includes, but is not limited to, the case where the adaptive equalizer h is used only to improve the performance of the TR entity 102 by equalizing its input data and the combination of the equalizer h, the TR entity 102, the decision device or slicer 108, and the error feedback summer 110 are embedded within a larger communications receiver to adjust only the ADC timing for a larger, more complex equalizer to improve its performance. Other such advance embodiments and applications will be described in greater detail later.

Returning to FIG. 1, an embodiment of the invention will be described for the case in which the equalizer h 104 is a three coefficient FIR filter of the form $$h = \alpha \cdot [1\ 0\ \beta]^T \qquad \text{Equation 1}$$

where $\alpha$ and $\beta$ are the two adjustable coefficients. In typical cases where a bandpass or low-pass channel impairment is being compensated, both coefficients are real with $\alpha > 0$ reflecting the gain of the overall compensation and $\beta \leq 0$ the degree of bandpass characteristic used. Those versed in the art will recognize that this form of h is effective for the equalization of low-pass and bandpass channel impairments, particularly for communications systems such as T3, E3, and STS-1 that use bipolar return-to-zero (RZ) signaling in which the second half of each +1 or −1 symbol period is set to zero. If such an RZ signal is sampled by the ADC at twice the symbol rate, i.e., the RZ signaling rate, for equalization, every other half-symbol period is known to be ideally zero and hence does not require corresponding nonzero coefficients in the equalizer. The equalizer form shown in Equation 1 is the shortest equalizer exploiting this property for RZ equalization. Extensions to longer length equalizers that can exploit this property will be described later in connection with Equations 24 to 26. One skilled in the art will also understand that the same applies to Nyquist or critically sampled signals using NRZ signaling. In both cases, empirical evidence shows that reduced complexity equalizers exploiting these properties of the equalizer input signal structure also perform better than their general coefficient counterparts. The following will be described for the general case without any restrictions on the nature of $\alpha$ and $\beta$. The frequency response $H(\omega)$ representation of h is then a function of the radian frequency variable $\omega$ over the range $-\pi/T$ to $\pi/T$ rad/s, where T is the sampling period. This frequency response is known to be $$H(\omega) = \alpha \cdot (e^{j\omega} + \beta \cdot e^{-j\omega}) = \alpha \cdot [(1+\beta)\cos \omega + j(1-\beta)\sin \omega] \qquad \text{Equation 2}$$

where, for the moment, we take the indices of the coefficients of h to be [−1 0 1], i.e., $\beta$ is a single postcursor coefficient. It is straightforward to derive the magnitude (squared) response $|H(\omega)|^2$ and group delay response $GD(\omega)$ of h as $$|H(\omega)|^2 = \alpha^2 \cdot [1 + \beta \cdot (\beta + 2 \cdot \cos 2\omega)] \qquad \text{Equation 3}$$

$$GD(\omega) = \frac{\alpha^2 \cdot (\beta^2 - 1)}{|H(\omega)|^2} \qquad \text{Equation 4}$$

where we have used the relationship $$GD(\omega) = -\frac{\partial \angle H(\omega)}{\partial \omega} = \text{Re}\left[\frac{\sum_n n h_n e^{-j\omega n}}{\sum_n h_n e^{-j\omega n}}\right], \quad n = -1, 0, 1 \qquad \text{Equation 5}$$

with $\angle$ being the complex angle operator, $\text{Re}[x]$ being the real part of x and $h_n$ being the coefficient of h at index n. To demonstrate the inherent group delay stability aspect, we study the effect of a perturbation $\epsilon$ in the delay of the channel $H_c$ being equalized on the mean-square error (MSE)-minimizing value of $\beta$. Without loss of generality, we can set $\alpha = T = 1$ and consider the case of direct modeling/approximation of $H_c(\omega)$ with the filter $[1\ 0\ \beta]$. By Parseval's relation, the output MSE is proportional to the output integrated squared error (ISE) E where $$E = \int_{-\pi}^{\pi} |H_c(\omega) - H(\omega)|^2 |X(\omega)|^2\, d\omega \qquad \text{Equation 6}$$

where $X(\omega)$ is the spectrum of the equalizer input signal. Using the differential relations for a complex-valued function $f$ of a real variable x $$\frac{\partial}{\partial x}|f(x)|^2 = 2\,\text{Re}\left[f(x) \cdot \frac{\partial f^*}{\partial x}\right] = 2\,\text{Re}\left[f^*(x) \cdot \frac{\partial f}{\partial x}\right] \qquad \text{Equation 7}$$

we find that $$\frac{\partial E}{\partial \beta} = 2\int_{-\pi}^{\pi} \text{Re}[\{H_c(\omega) - H(\omega)\} \cdot e^{j\omega}] \cdot |X(\omega)|^2\, d\omega \qquad \text{Equation 8}$$

where we have assumed the usual regularity conditions to permit differentiation under the integral sign (the Lebesgue differentiation theorem). For greater generality, we allow the index of the $\beta$ coefficient to be at a general positive integer n other than 1 as previously stated. Substituting $$H(\omega)=e^{j\omega}+\beta\cdot e^{-jn\omega} \qquad \text{Equation 9}$$

and writing $$H_c(\omega) \equiv |H_c(\omega)|\cdot e^{j\angle H_c(\omega)} \qquad \text{Equation 10}$$

yields $$\frac{\partial E}{\partial \beta}=2\int_{-\pi}^{\pi}\text{Re}\left[|H_c(\omega)|\cdot e^{j(\angle H_c(\omega)+\omega)}-e^{j2\omega}-\beta\cdot e^{j(-n+1)\omega}\right]\cdot |X(\omega)|^2 d\omega \qquad \text{Equation 11}$$

Taking the real part under the integral, $$\frac{\partial E}{\partial \beta}= 2\int_{-\pi}^{\pi}[|H_c(\omega)|\cos(\angle H_c(\omega)+\omega)-\cos(2\omega)-\beta\cos(n-1)]\cdot |X(\omega)|^2 d\omega \qquad \text{Equation 12}$$

A good, such as optimal, value $\beta_o$ of $\beta$ which minimizes E satisfies the stationarity condition $$\left.\frac{\partial E}{\partial \beta}\right|_{\beta_0}= 2\int_{-\pi}^{\pi}[|H_c(\omega)|\cos(\angle H_c(\omega)+\omega)-\cos(2\omega)-\beta_o\cos(n-1)]\cdot |X(\omega)|^2 d\omega = 0 \qquad \text{Equation 13}$$

which can be solved for $\beta_o$ to yield $$\beta_o = \frac{\int_{-\pi}^{\pi}[|H_c(\omega)|\cdot\cos(\angle H_c(\omega)+\omega)-\cos(2\omega)]\cdot |X(\omega)|^2 d\omega}{\int_{-\pi}^{\pi}|X(\omega)|^2\cos(n-1)d\omega} \qquad \text{Equation 14}$$

Equation 14 is a useful expression in its own right as it shows the dependence of the value $\beta_o$ of $\beta$ on the channel $H_c(\omega)$ being equalized and the input signal spectrum $X(\omega)$, e.g., $\beta_o$ is inversely proportional to the input signal energy. We are interested, however, in the behavior of $\beta_o$ as a function of small perturbations $\epsilon$ in the group delay of $H_c$, i.e., $$\beta_o(\varepsilon) = \frac{\int_{-\pi}^{\pi}[|H_c(\omega)|\cdot\cos(\angle H_c(\omega)+\omega+\varepsilon\omega)-\cos(2\omega)]\cdot |X(\omega)|^2 d\omega}{\int_{-\pi}^{\pi}|X(\omega)|^2\cos(n-1)d\omega} \qquad \text{Equation 15}$$

To focus our attention to the region near the origin in $\epsilon$, we expand the cos term as $$\cos(\angle H_c(\omega)+\omega+\epsilon\omega)=\cos(\angle H_c(\omega)+\omega)\cdot\cos(\epsilon\omega)-\sin(\angle H_c(\omega)+\omega)\cdot\sin(\epsilon\omega) \qquad \text{Equation 16}$$

and use the small signal approximation (valid for small $\epsilon$)

$$\sin(\epsilon\omega)=\epsilon\omega+O(\epsilon^3\omega^3)\approx 0 \qquad \text{Equation 17}$$

Equation 17 where O(k) represents higher order terms in k to be ignored. This approximation enables us to write $$\beta_o(\varepsilon) \approx \frac{\int_{-\pi}^{\pi}[|H_c(\omega)|\cdot\{\cos(\angle H_c(\omega)+\omega)\cdot\cos(\varepsilon\omega)\}-\cos(2\omega)]\cdot |X(\omega)|^2 d\omega}{\int_{-\pi}^{\pi}|X(\omega)|^2\cos(n-1)d\omega} \qquad \text{Equation 18}$$

Differentiating with respect to the perturbation $\epsilon$ (again assuming regularity so that differentiation within the integral is valid) and using the approximation of Equation 17 again, we find that $$\frac{\partial \beta_o}{\partial \varepsilon} \approx \frac{\int_{-\pi}^{\pi}[|H_c(\omega)|\cdot-\cos(\angle H_c(\omega)+\omega)\cdot\varepsilon\omega^2]\cdot |X(\omega)|^2 d\omega}{\int_{-\pi}^{\pi}|X(\omega)|^2\cos(n-1)d\omega} \qquad \text{Equation 19}$$

Figure 2:
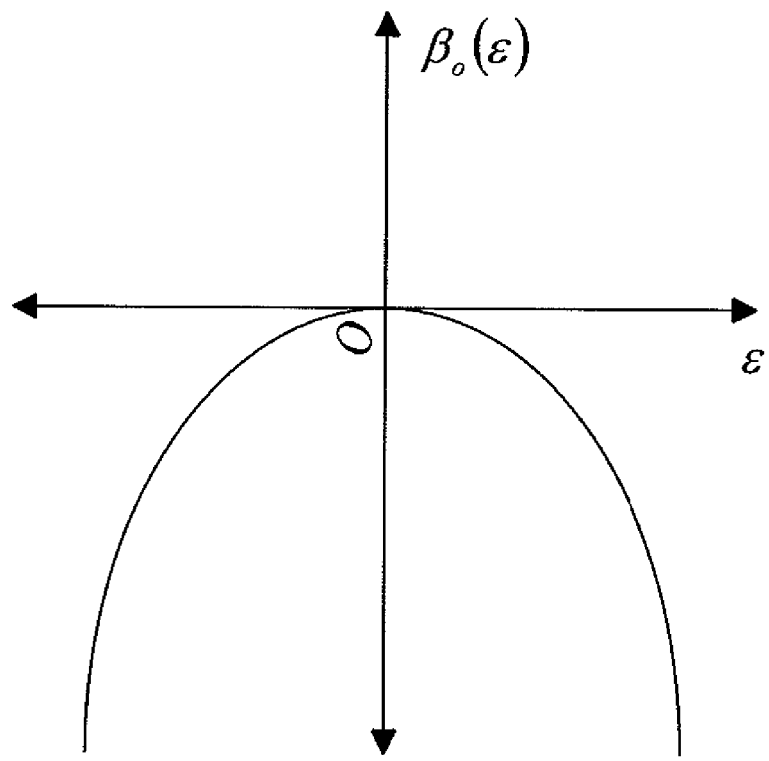
FIG. 2 is a graphical illustration of a favorable characteristic for the parameters of an equalizer.

For every $\epsilon\neq 0$, the product of the cos term and the $\epsilon\omega^2$ term is an even function of $\omega$, so the integrand in the numerator of the right-hand side is even, implying that $|\partial\beta_o/\partial\epsilon|$ is nonzero (in fact, $\text{sgn}(\partial\beta_o/\partial\epsilon)=-\text{sgn}(\epsilon)$). Only for $\epsilon=0$ is $\partial\beta_o/\partial\epsilon$ equal to zero, which implies that the optimal value $\beta_o$ of $\beta$ for a given channel condition will tend resist, i.e., to be stable with respect to, the introduction of any small perturbation $\epsilon$ in the channel group delay. Equation 19 and its corresponding second derivative $\partial^2\beta_o/\partial\epsilon^2$ implies that the optimal value $\beta_o$ of $\beta$ for a given channel condition is locally (negatively) quadratic about $\epsilon=0$ as shown in FIG. 2.

After the equalizer 104 has adapted to reach a relatively good, such as an optimal state $\beta=\beta_o$, for a given channel condition, it will tend to resist the small perturbations in the perceived group delay of the channel being compensated due to the inherent variance of the recovered timing from the timing recovery entity. A useful analogy is that of a marble resting at the bottom of a (smooth) bowl; this situation represents $\beta$ at its optimal state $\beta=\beta_o$. According to the previous analysis, it is only in this position that the marble tends to stay in place despite the application of small perturbational forces, e.g., by shaking the bowl gently—had the marble been placed anywhere else in the bowl, its sensitivity to any small motion in the bowl is amplified.

We have thus illustrated that when the equalizer 104 assumes the special form expressed in Equation 1, the resulting equalizer coefficients are inherently resistant to any small perturbations in the perceived group delay of the channel being compensated when those coefficients have been adjusted to relatively good, such as their optimal values, according to a least MSE criterion. As a result, the equalizer 104 can adapt at the same time that the TR entity 102 is adjusting gradually the recovered timing of the equalizer's input based on its (equalized) output. We therefore have stabilized (digital) timing recovery from the receiver input s to the ADC output x. The algorithm and associated structures to adapt the equalizer coefficients to achieve and maintain the special form in Equation 1 is described in the following.

The subject of adaptive equalization algorithms and techniques is well-studied in several works in the art. It may not be readily apparent how the special form of Equation 1 can be first initialized and subsequently enhanced by appropriate choice of the adaptive equalization technique. To this end, we shall describe in detail the application of the least mean squares (LMS) adaptation technique to the special equalizer form. This technique is selected for its relative effectiveness given its conceptual simplicity and relatively low complexity and is not intended to be limiting in any way. Indeed, once the general principles of adapting the special equalizer form are understood, one skilled in the art can readily modify and extend the exemplary LMS-based technique to any number of advanced techniques, including the recursive least squares (RLS) filter and Kalman filter adaptation algorithms, amongst others.

To illustrate the application of the LMS adaptation algorithm to the proposed equalizer structure, we use the basic three coefficient case previously analyzed and formulate the problem as $$P(\alpha, \beta) = \|y_{est} - \alpha [1 \quad 0 \quad \beta]x\|^2 \to \min_{\alpha, \beta} \qquad \text{Equation 20}$$

where P represents the least-squares cost or error function to be minimized by selection of $\alpha$ and $\beta$, x is a vector representing a collection or sequence of equalizer input samples, and $y_{est}$ corresponding collection or sequence of desired equalizer output samples. Data for the latter are typically assumed to be provided by a decision device 108 as shown in the configuration of FIG. 1. Without limiting the scope of the invention, exemplary decision devices include symbol-by-symbol decoders such as hard decision slicers as well as sequence estimators such as decision feedback decoders, Viterbi decoders, and their soft decision variants. Those skilled in the art will appreciate that the decision to employ a higher performance decoder such as a Viterbi decoder to improve the quality of the desired equalizer output samples should be balanced against the extra complexity and latency of those methods compared to simpler methods such as symbol-by-symbol hard decision slicing. To apply the LMS algorithm to the reduction, such as minimization, of P in Equation 20, the gradients of the cost function P are used which can be computed straightforwardly as $$\nabla_\alpha P(\alpha,\beta) = -e \cdot (x_1 + \beta x_{-1}) \nabla_\beta P(\alpha,\beta) = -e \cdot \alpha x_{-1} \qquad \text{Equation 21}$$

where, as shown in FIG. 1, e is the error of the decision device 108 for the equalizer output corresponding to the current equalizer input sample $x_0$, $x_1$ is the next (future) equalizer input sample, and $x_{-1}$ is the previous (past) equalizer input sample. The resultant LMS algorithm using these gradients can then be stated as $$\alpha \leftarrow \alpha + \mu_\alpha e \cdot (x_1 + \beta x_{-1})$$

$$\beta \leftarrow \beta + \mu_\beta e \cdot \alpha x_{-1}$$

$$h \leftarrow \alpha [1 \, 0 \, \beta]^T \qquad \text{Equation 22}$$

where $\mu_\alpha$ and $\mu_\beta$ are the update step sizes for the adaptation of $\alpha$ and $\beta$, respectively. The corresponding equalizer output is computed as $$y \leftarrow h^T [x_1 x_0 x_{-1}] = \alpha(x_1 + \beta x_{-1}) \qquad \text{Equation 23}$$

Figure 3:
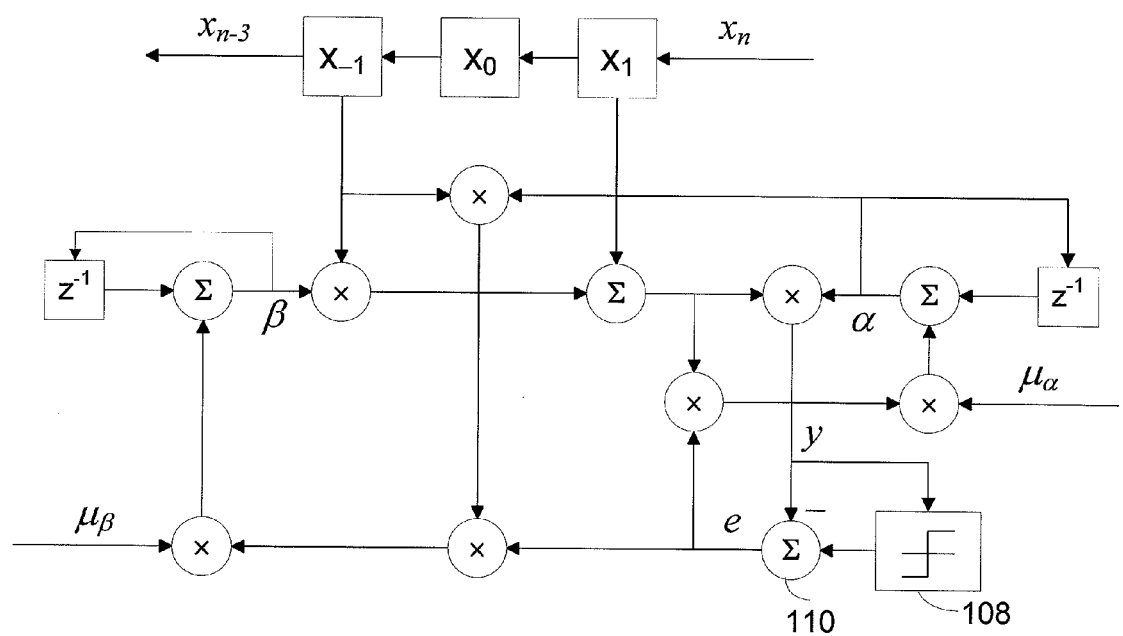
FIG. 3 illustrates an embodiment of a least means square (LMS) adaptive equalizer.

In the art, one may find numerous methods and techniques for selecting and modifying the update step sizes dynamically to achieve various desirable properties (at the cost of increased complexity). Nonetheless, it is clear that once the adaptive equalizer has been initialized with the desired coefficient structure, adjustment of $\alpha$ and $\beta$ according to the relations in Equation 22 will maintain that desired coefficient structure and attempt to enhance its performance (as measured by the cost function P in Equation 20). One embodiment of the LMS adaptive equalizer is shown in FIG. 3, where the ADC 106 and TR entity 102 of FIG. 1 have been omitted to simplify the diagram. In FIG. 3, equalizer input data (whose timing has been adjusted at the ADC 106 under the control of the TR entity 102) flow in sample-by-sample from right to left as marked by $x_n$. The three entities marked $x_{-1}$, $x_0$, and $x_1$ form a delay line and are typically implemented with sample-clocked memory elements. At each sample clock cycle, entity $x_1$ passes its data to entity $x_0$, entity $x_0$ passes its data to $x_{-1}$, and $x_0$ outputs its data as $x_{n-3}$ which is the equalizer input sample three sample-clocks prior to the current equalizer input sample $x_n$. Those skilled in the art can verify that by using the two unit sample-clock delay memory elements marked $z^{-1}$, the circuit shown in FIG. 3 both adapts the equalizer coefficients $\alpha$ and $\beta$ according to Equation 22 and generates an equalizer output y according to Equation 23, where each memoryless circuit processing element (such as an arithmetic operator) is assumed to operate once per clock cycle when its inputs are ready. The coefficients $\mu_\alpha$ and $\mu_\beta$ correspond to updating coefficients related to the gain for adaptive adjustments to equalizer coefficients $\alpha$ and $\beta$.

Figure 4:
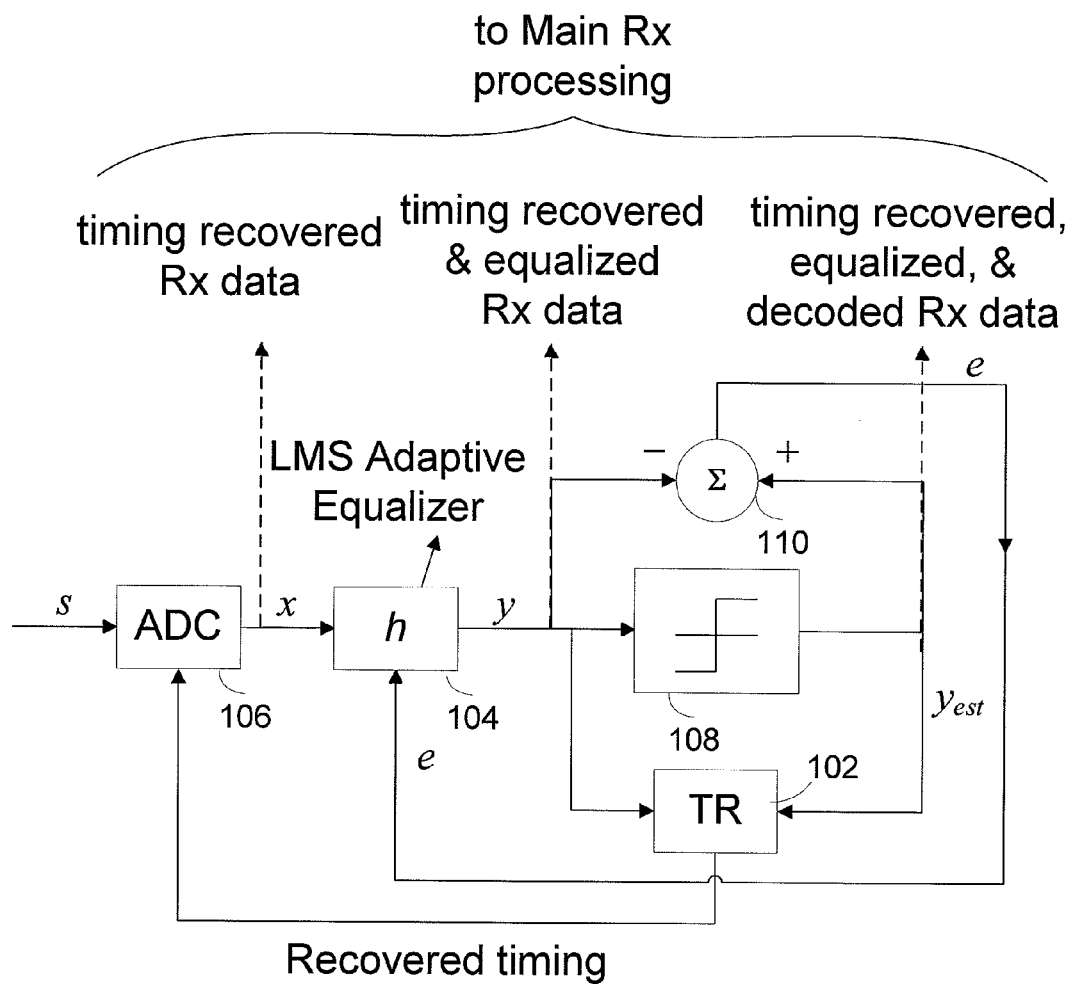
FIG. 4 illustrates the embodiment of FIG. 1 with additional labeling.

Operation will now be described. In the embodiment shown in FIG. 4, the embodiment operates independently of the main receiver (Rx) processing and provides to it one of the unequalized or equalized timing recovered data x or y, respectively, or the timing recovered, equalized, and decoded data $y_{est}$. The choice between the first two outputs depends on whether the basic equalization provided by the previously described embodiment of FIG. 3 of the LMS adaptive equalizer with three coefficients in h is sufficient for the purposes of subsequent receiver processing. In cases where simplicity is favored over performance, the decision device 108 can comprise a simple symbol-by-symbol slicer or quantizer whose output can be adequate by itself as the receiver output or with subsequent receiver processing, e.g., by a maximum likelihood or maximum a posteriori sequence estimator. Continuing with the illustrated embodiment's operation, the decision device 108 performs a symbol-by-symbol slice or quantization to map each input y onto a decoded symbol $y_{est}$. The decision error e between y and $y_{est}$ is then used to adapt the coefficients h of the equalizer 104 according to the LMS algorithm as previous described. At the same time, the timing recovery entity TR 102 compares y to $y_{est}$ to compute a recovered timing signal which is used to adjust the sample timing at the ADC. Although the adaptive equalizer 104 in the embodiment of FIG. 3 retains its advantages independent of the choice of TR entity 102, a typical choice balancing performance, latency, and complexity can comprise an early-late gate timing error detector (TED) followed by a first or second order IIR filter for noise smoothing.

One aspect of the embodiment illustrated in FIG. 3 is that the elements can operate simultaneously without the loss of performance or the timing instability as occurs in the prior art.

Several alternative embodiments of the invention will now be described. Other variations will be readily apparent to the skilled practitioner.

Figure 5:
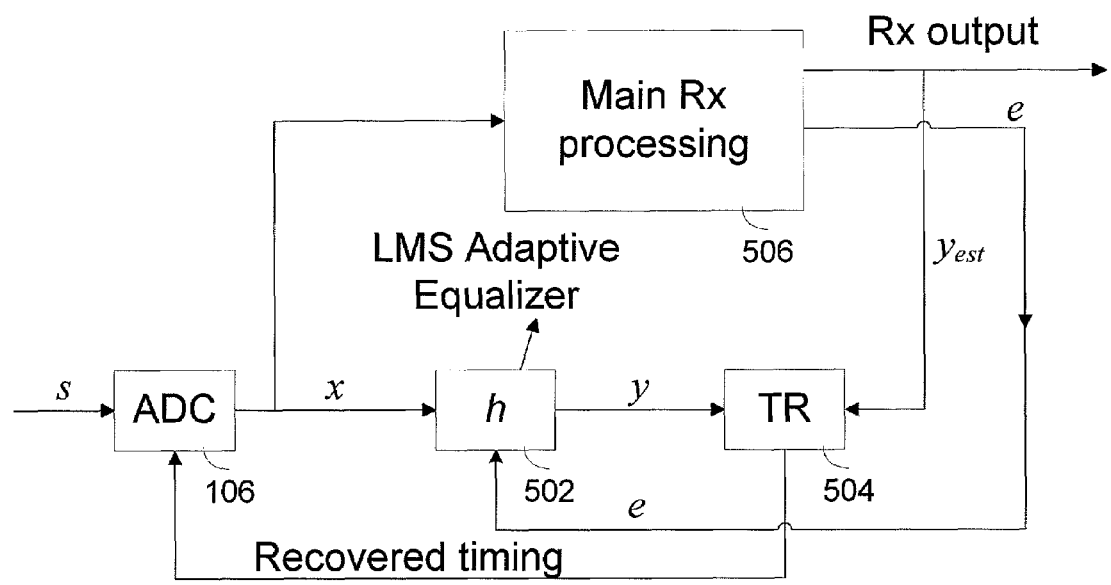
FIG. 5 illustrates an alternative embodiment with a separate main RX processing entity.

In a first alternative embodiment of the invention shown in FIG. 5, the error signal e for the adaptive equalizer 502 and the decoded output symbol $y_{est}$ for the TR entity 504 are provided by the main receiver processing entity 506 which processes the timing recovered data x instead of being provided by the decision device 108 as in the embodiment of FIG. 3. Those skilled in the art will recognize that this alternative embodiment allows the equalizer 502 to adapt to optimize different criteria that can be tailored for the intended receiver operation instead of simply minimizing the receiver MSE. For example, in high-data rate digital subscriber line (xDSL) technologies, the time domain equalizer 502 is utilized to mitigate DMT/OFDM intersymbol interference by shortening the channel impulse response. The adaptive criteria to achieve this goal is considerably different from the MSE criteria described for the embodiment of FIG. 4, hence the need for the alternative embodiment. So long as these adaptive criteria can be expressed as the minimization of the squared error between a function of the equalizer's frequency response and some target frequency response, the previous timing perturbation analysis holds and the adaptive equalizer 502 retains its desirable property of resistance to relatively small perturbations in the group delay of the target frequency response. Even in the case where the minimization of the receiver MSE remains the adaptive equalizer's goal, the alternative embodiment permits the equalizer 502 to adapt with higher quality error data e from the main receiver processing entity 506, which can presumably generate higher quality decoded output symbols for $y_{est}$. This higher quality $y_{est}$ would presumably also improve the quality of the recovered timing from the TR entity 504.

Figure 6:
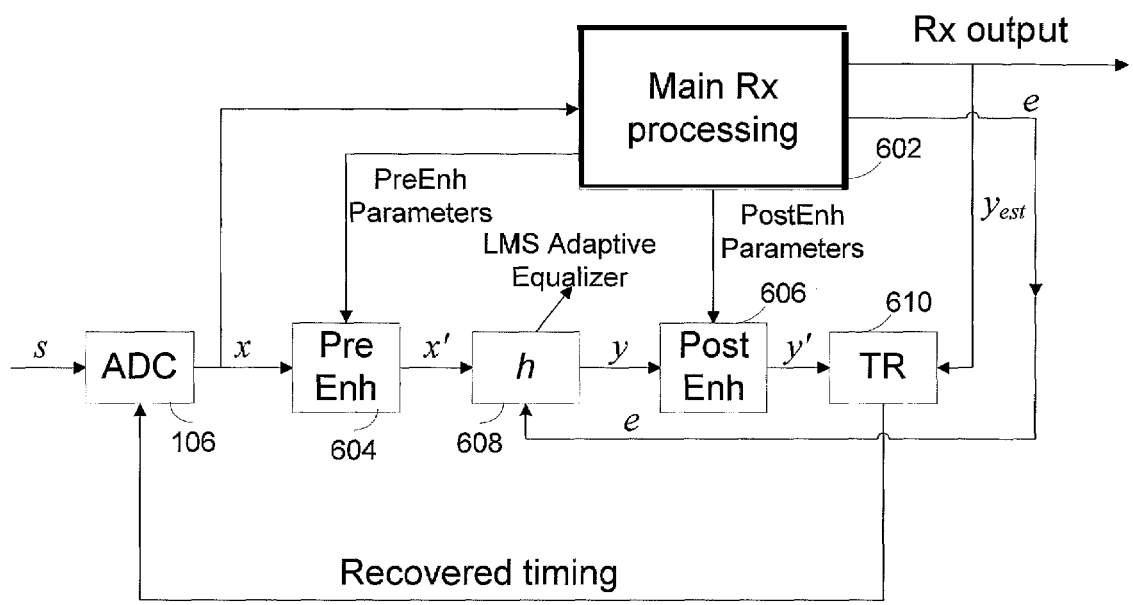
FIG. 6 illustrates an alternative embodiment with pre and post equalizer enhancement from separate main Rx processing entity.

In a second alternative embodiment of the invention shown in FIG. 6, the separate main receiver processing entity 602 provides additional parameters to both pre process 604 and post process 606 the equalizer input and output, respectively, to enhance the equalizer output quality for the decision device symbol decoding. These parameters and their processing would be chosen to suit the particular problem and application at hand. For example, residual DC offset and baseline wander are frequently encountered impairments which the equalizer 608 cannot correct effectively. Such corrections can be incorporated as possible pre and post enhancements to the equalizer input and output, respectively. The pre enhancement circuit 604 and post enhancement circuit 606 should not respond significantly to adjustments imparted by the TR entity 610 to the recover timing or else the problem of timing interaction between the enhancement processing and the TR entity's recovered timing will manifested as in the case of the conventional adaptive equalizer.

Figure 7:
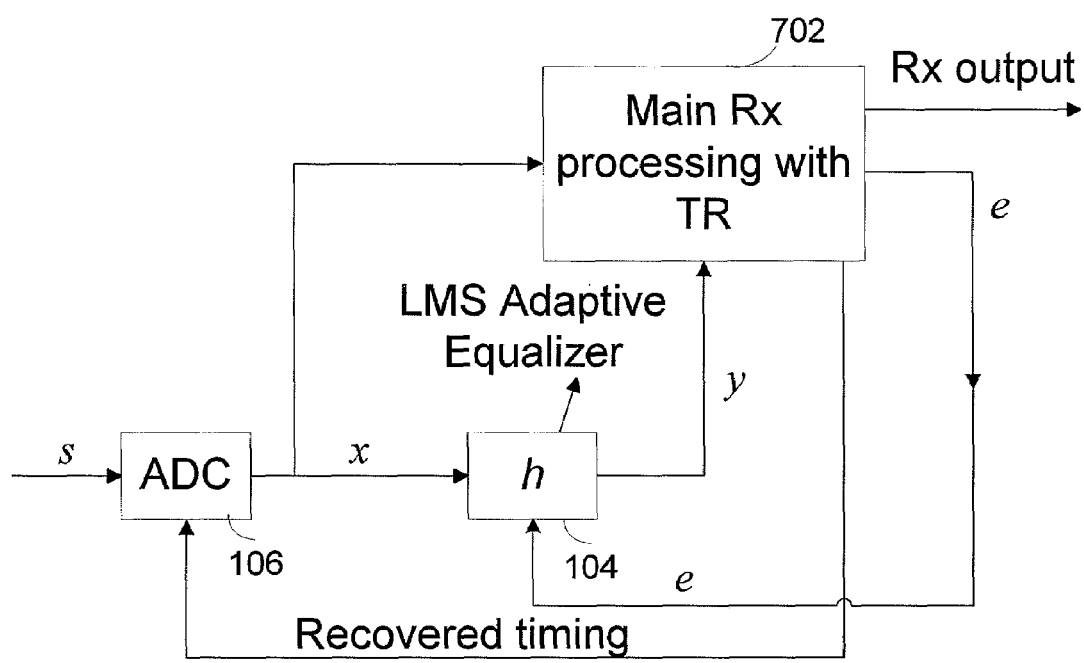
FIG. 7 illustrates an alternative embodiment with timing recovery (TR) in separate main Rx processing entity.

In a third alternative embodiment of the invention shown in FIG. 7, the TR entity is incorporated into the main receiver processing entity 702. Compared to the embodiment of FIG. 4, this alternative embodiment allows for a more sophisticated TR entity which recovers timing from information other than simply the equalizer output y and the decoded symbol $y_{est}$. This alternative embodiment retains the advantage of stabilized timing recovery while permitting more general TR entities to be employed in the main receiver processing entity.

Figure 8:
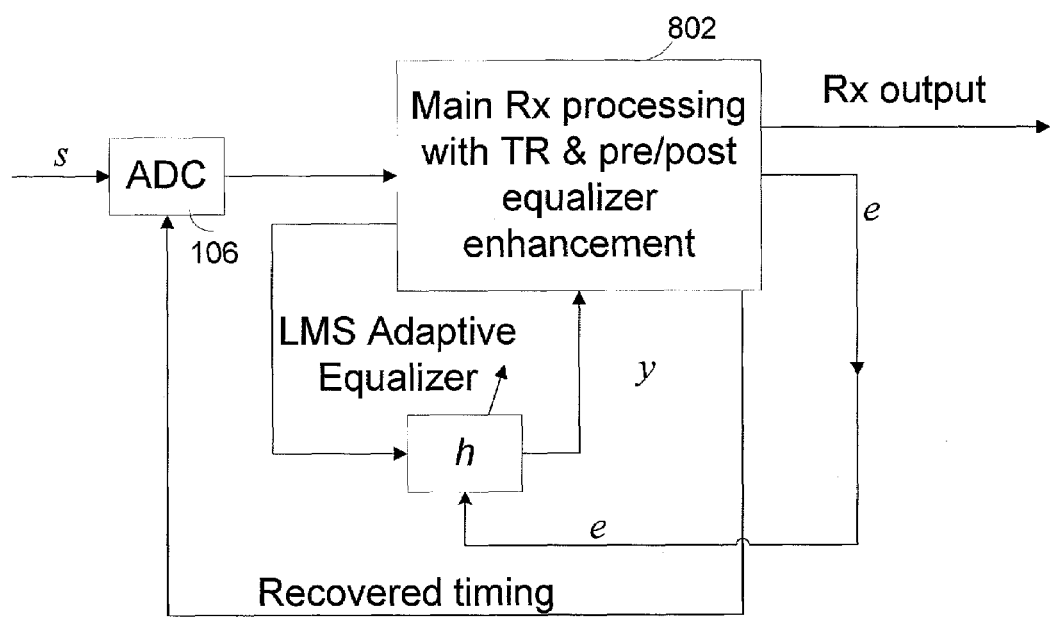
FIG. 8 illustrates an alternative embodiment with timing recovery (TR) and pre/post enhancement in separate main Rx processing entity.

In a fourth alternative embodiment of the invention shown in FIG. 8, the TR entity and both the pre and post equalizer input/output enhancement processing are included within the main receiver processing entity 802. This alternative embodiment represents a relatively high level of integration in which only the adaptive equalizer remains exposed to emphasize its importance in achieving stabilized digital timing recovery. It will be understood, however, that the various blocks shown can be included in the same integrated circuit or in separate circuits.

It will be readily apparent to one skilled in the art that a wide variety of extensions and modifications can be included. For example, one embodiment allows the insertion of one or more processing blocks in the data path for x from the ADC output to the equalizer input and similarly for the data path for y from the equalizer output to the decision device input. So long as these inserted processing blocks do no significantly interact with the group delay response of the adaptive equalizer or the timing recovered by the TR entity, stable timing recovery should be preserved.

Advanced Embodiments

In some advanced applications, a higher degree of equalization than can be achieved with the basic three coefficient FIR filter in the embodiment illustrated in FIG. 3 is desirable. To this end, one advanced embodiment incorporates more than three coefficients in the general form $$h = \alpha \cdot [1 0 \beta_1 0 \beta_2 0 \ldots 0 \beta_m]^T = \alpha \cdot [1 0 \beta]^T \qquad \text{Equation 24}$$

where $\alpha$ is as before and $\beta = [\beta_1\ 0\ \beta_2\ 0\ \ldots\ \beta_m]^T$ is a vector of m coefficients, both of which are adaptive. In one embodiment, the number of taps is an odd number greater than or equal to 3, and every other tap has a coefficient that is zero or near zero. Preferably, the every other coefficient is zero because zero provides computational advantages over a non-zero value that is near zero. In addition, it should be noted that a filter with an odd number of taps can be constructed from a filter with a larger number of taps, such as a filter with an even number of taps, than are actually used by setting the unused taps to zero or near zero. The corresponding equalized output is $$y \leftarrow h^T [x_1\ x_0\ x] = \alpha \left( x_1 + \sum_{i=1}^{m} \beta_i x_{1-2i} \right) \qquad \text{Equation 25}$$

where the input vector x is defined as $x = [x_{-1}\ x_{-2} \ldots x_{-(2m-1)}]^T$ (indexed relative to the current input $x_0$). For this arbitrary case, it is difficult to extend the previous direct proof of the inherent stability of the vector $\beta$ of coefficients to small perturbations in the group delay response of the perceived channel being compensated but empirical evidence has demonstrated this stability when the corresponding extended LMS adaptation update algorithm $$\alpha \leftarrow \alpha + \mu_\alpha e \cdot (x_1 + \beta^T x)$$

$$\beta \leftarrow \beta + \mu_\beta e \cdot \alpha x$$

$$h \leftarrow \alpha [1 0 \beta]^T \qquad \text{Equation 26}$$

is used. In Equation 26, $\mu_\alpha$ and $\mu_\beta$ are the update step sizes for the adaptation of $\alpha$ and $\beta$, respectively (for the latter, $\mu_\beta$ can be more generally a diagonal matrix of appropriate dimensions instead of a scalar so that each element of the vector $\beta$ can have its own update step size). It will be evident to those skilled in the art that the extended form of Equation 24 exploits the known half-symbol zero intervals between the half-symbol information-bearing intervals for the equalization of RZ-rate sampled RZ data to improve equalizer performance. Although not readily apparent, it is also known in the art that adaptive equalization with the structure shown in Equation 24 can improve equalization performance for twice oversampled NRZ data.

Figure 9:
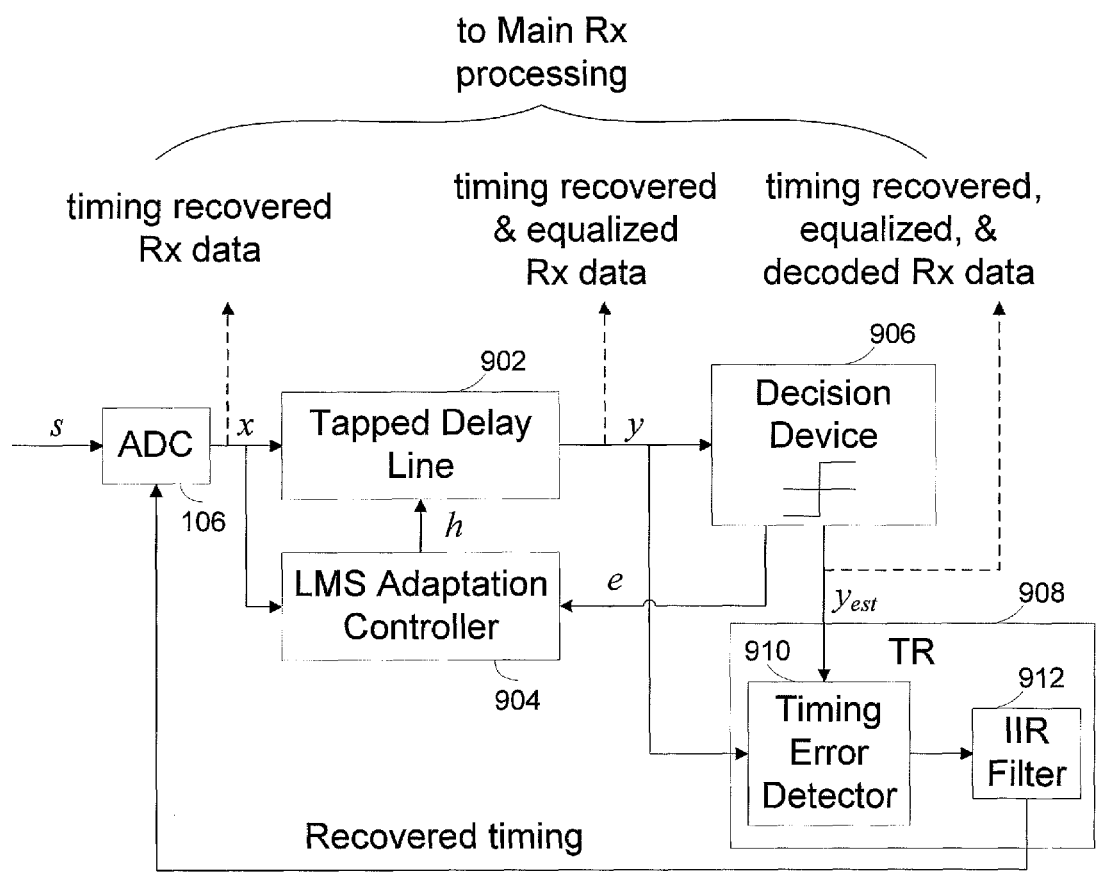
FIG. 9 illustrates an embodiment of an equalizer having stabilized digital timing recovery using low-complexity.

FIG. 9 illustrates an embodiment of the stabilized digital timing recovery using low-complexity equalizer. A Tapped Delay Line 902 implements the digital filtering of the receiver input data. The coefficients for the Tapped Delay Line 902 are provided by the LMS Adaptation Controller 904. The Decision Device 906 is typically a symbol quantizer or slicer operating on a symbol-by-symbol basis. The TR entity 908 can be realized by a combination of a Timing Error Detector device 910 followed by an IIR Filter 912 for smoothing. For high data rate communications receivers, these functional entities can be implemented using dedicated hardware such as a field programmable gate array (FPGA) or dedicated silicon in an application specific integrated circuit (ASIC). For lower data rate communications receivers, a digital signal processor such as a TMS320C60 from Texas Instruments or a SHARC processor from Analog Devices can capture the digital receiver input data x and perform the equivalent computations of each functional entity. The various blocks can be partitioned in various ways between hardware and software or firmware programmable implementation, and it is not the intention of the description of this embodiment to limit the scope of this disclosure in this respect.

The implementation of the Stabilized Digital Timing Recovery Using Low-Complexity Equalizer is an alternative to other existing techniques such as parallel independent digital timing recovery from unequalized data and adaptive equalization on nontiming recovered data, nonsimultaneous sequential timing recovery and equalizer adaptation, and constrained sequential equalizer adaptation with simultaneous timing recovery. Each technology has its advantages and disadvantages.

A Stabilized Digital Timing Recovery Using Low-Complexity Equalizer is relatively simple to implement as compared with other digital timing recovery techniques. Furthermore, embodiments of the invention advantageously exhibit relatively high performance and relatively high efficiency.

The Stabilized Digital Timing Recovery Using Low-Complexity Equalizer disclosed herein can be implemented in a custom integrated circuit or by software running on a general purpose digital signal processor or microprocessor for application to a variety of digital communications receiver devices.

The Stabilized Digital Timing Recovery Using Low-Complexity Equalizer technique is useful in a variety of applications including physical layer transceivers for T3 and E3 plesiochronos digital hierarchy digital transmission systems and SONET STS-1 transmission systems. These transceivers have preferably relatively high performance and low complexity timing recovery mechanisms. The design is also applicable to physical layer transceivers for HDSL transmission systems such as ISDN and other passband line code systems such as CAP xDSL. The approach is also applicable to other commercial systems including mass storage devices, such as magnetic recording systems, disk drive storage systems, and the like. In fact, the disclosed techniques can be applied advantageously to any digital receiver for oversampled baud-rate baseband signaling systems using high performance, low complexity timing recovery in the face of low and band-pass channel impairments.

Various embodiments of the invention have been described in this document. Although this invention has been described with reference to these specific embodiments, the descriptions are intended to be illustrative of the invention and are not intended to be limiting. Various modifications and applications may occur to those familiar with the subject without departing from the spirit and scope of the invention as defined in the appended claims.

What is claimed is:

1. An apparatus for adaptively compensating for impairments in a transmission channel, the apparatus comprising:
    an analog-to-digital converter, wherein the analog-to-digital converter is configured to sample an input signal from the transmission channel and to provide a digital output of the input signal;
    an adaptive equalizer implemented in the digital domain by a digital filter, wherein the equalizer has a band-pass filter characteristic, wherein the adaptive equalizer is configured to receive a digital signal as an input, wherein the digital signal is at least based on the digital output of the analog-to-digital converter, wherein the digital filter comprises a finite impulse response (FIR) filter having three or more FIR filter coefficients, wherein odd coefficients of the FIR filter are nonzero and adaptively adjusted, and wherein even coefficients of the FIR filter are zero or nearly zero regardless of the adjustments to the odd coefficients; and
    a timing recovery circuit operatively coupled at least to an output of the adaptive equalizer, wherein the timing recovery circuit is configured to adjust sampling timing of the analog-to-digital converter.

2. The apparatus as defined in claim 1, wherein an input of the adaptive equalizer is operatively coupled to an output of the analog-to-digital converter, and wherein an input of the timing recovery circuit is operatively coupled to an output of the adaptive equalizer, the apparatus further comprising: a decision device coupled to the output of the adaptive equalizer such that the decision device determines a symbol based on the output of the adaptive equalizer.

3. The apparatus as defined in claim 1, wherein an input of the adaptive equalizer is operatively coupled to an output of the analog-to-digital converter, and wherein an input of the timing recovery circuit is operatively coupled to an output of the adaptive equalizer, the apparatus further comprising a main receiver processing entity coupled to the output of the analog-to-digital converter, and wherein the receiver processing entity is configured to generate symbols.

4. The apparatus as defined in claim 3, further comprising a pre-processing circuit disposed in the processing path between the analog-to-digital converter and the adaptive equalizer, wherein the pre-processing circuit is configured to modify the output of the analog-to-digital converter adaptively at least partially in response to a control from the main receiver processing entity, wherein the pre-processing circuit is configured to correct at least one of residual DC offset or baseline wander.

5. The apparatus as defined in claim 4, wherein the pre-processing circuit is integrated with the main receiver processing entity.

6. The apparatus as defined in claim 1, wherein the timing recovery circuit is further configured to adjust sampling timing based at least partially on the output of the analog-to-digital converter in addition to the output of the adaptive equalizer.

7. The apparatus as defined in claim 1, wherein the adaptive equalizer comprises a tapped delay line and an adaptation controller, and wherein the timing recovery circuit comprises a timing error detector and an infinite impulse response (IIR) filter.

8. The apparatus as defined in claim 1, wherein the transmission channel comprises a cable.

9. An apparatus for adaptively compensating for impairments in a transmission channel, the apparatus comprising:

an analog-to-digital converter, wherein the analog-to-digital converter is configured to sample an input signal from the transmission channel and to provide a digital output of the input signal;

an adaptive equalizer implemented in the digital domain by a digital filter, wherein the equalizer has a band-pass filter characteristic, wherein the adaptive equalizer is configured to receive a digital signal as an input, wherein the digital signal is at least based on the digital output of the analog-to-digital converter, wherein the digital filter is a finite impulse response (FIR) filter having FIR filter coefficients represented by vector h, wherein: $h = \alpha \cdot [1 \ \sigma \ \beta]^T$, wherein the $\alpha$ and $\beta$ coefficients are adaptively adjusted coefficients, and the $\sigma$ coefficient comprises zero or near-zero values; and a timing recovery circuit operatively coupled at least to an output of the adaptive equalizer, wherein the timing recovery circuit is configured to adjust sampling timing of the analog-to-digital converter.

10. The apparatus as defined in claim 9, wherein the $\sigma$ coefficient comprises zero.

11. An apparatus for adaptively compensating for impairments in a transmission channel, the apparatus comprising:

an analog-to-digital converter, wherein the analog-to-digital converter is configured to sample an input signal from the transmission channel and to provide a digital output of the input signal;

an adaptive equalizer implemented in the digital domain by a digital filter, wherein the equalizer has a band-pass filter characteristic, wherein the adaptive equalizer is configured to receive a digital signal as an input, wherein the digital signal is at least based on the digital output of the analog-to-digital converter, wherein the digital filter is a finite impulse response (FIR) filter having FIR filter coefficients represented by vector h, wherein: $h = \alpha \cdot [1 \ \sigma_1 \ \beta_1 \ \sigma_2 \ \beta_2 \ \sigma_3 \ \ldots \ \sigma_m \ \beta_m]^T$, wherein the $\alpha$ and $\beta_x$ coefficients are adaptively adjusted coefficients and the $\sigma_x$ coefficients comprise zero or near-zero values; and a timing recovery circuit operatively coupled at least to an output of the adaptive equalizer, wherein the timing recovery circuit is configured to adjust sampling timing of the analog-to-digital converter.

12. The apparatus as defined in claim 11, wherein the $\sigma_x$ coefficients comprise zero.

13. An apparatus for adaptively compensating for impairments in a transmission channel, the apparatus comprising:

an analog-to-digital converter, wherein the analog-to-digital converter is configured to sample an input signal from the transmission channel and to provide a digital output of the input signal;

an adaptive equalizer implemented in the digital domain by a digital filter, wherein the equalizer has a band-pass filter characteristic, wherein the adaptive equalizer is configured to receive a digital signal as an input, wherein the digital signal is at least based on the digital output of the analog-to-digital converter, wherein an input of the adaptive equalizer is operatively coupled to an output of the analog-to-digital converter;

a timing recovery circuit operatively coupled at least to an output of the adaptive equalizer, wherein the timing recovery circuit is configured to adjust sampling timing of the analog-to-digital converter, wherein an input of the timing recovery circuit is operatively coupled to an output of the adaptive equalizer;

a main receiver processing entity coupled to the output of the analog-to-digital converter, and wherein the receiver processing entity is configured to generate symbols;

a pre-processing circuit disposed in the processing path between the analog-to-digital converter and the adaptive equalizer, wherein the pre-processing circuit is configured to modify the output of the analog-to-digital converter adaptively at least partially in response to a first control from the main receiver processing entity; and a post-processing circuit disposed in the processing path between the adaptive equalizer and the timing recovery circuit, wherein the post-processing circuit is configured to modify the output of the adaptive equalizer adaptively at least partially in response to a second control from the main receiver processing entity.

14. An apparatus for adaptively compensating for impairments in a transmission channel, the apparatus comprising:

an analog-to-digital converter, wherein the analog-to-digital converter is configured to sample an input signal from the transmission channel and to provide a digital output of the input signal;

an adaptive equalizer implemented in the digital domain by a digital filter, wherein the equalizer has a band-pass filter characteristic, wherein the adaptive equalizer is configured to receive a digital signal as an input, wherein the digital signal is at least based on the digital output of the analog-to-digital converter, wherein an input of the adaptive equalizer is operatively coupled to an output of the analog-to-digital converter;

a timing recovery circuit operatively coupled at least to an output of the adaptive equalizer, wherein the timing recovery circuit is configured to adjust sampling timing of the analog-to-digital converter, wherein an input of the timing recovery circuit is operatively coupled to an output of the adaptive equalizer; and a main receiver processing entity coupled to the output of the analog-to-digital converter, and wherein the receiver processing entity is configured to generate symbols;

wherein the pre-processing circuit and the post-processing circuit are integrated with the main receiver processing entity.

15. An apparatus for adaptively compensating for impairments in a transmission channel, the apparatus comprising:

an analog-to-digital converter, wherein the analog-to-digital converter is configured to sample an input signal from the transmission channel and to provide a digital output of the input signal;

an adaptive equalizer implemented in the digital domain by a digital filter, wherein the equalizer has a band-pass filter characteristic, wherein the adaptive equalizer is configured to receive a digital signal as an input, wherein the digital signal is at least based on the digital output of the analog-to-digital converter, wherein an input of the adaptive equalizer is operatively coupled to an output of the analog-to-digital converter;

a timing recovery circuit operatively coupled at least to an output of the adaptive equalizer, wherein the timing recovery circuit is configured to adjust sampling timing of the analog-to-digital converter, wherein an input of the timing recovery circuit is operatively coupled to an output of the adaptive equalizer;

a main receiver processing entity coupled to the output of the analog-to-digital converter, and wherein the receiver processing entity is configured to generate symbols; and a post-processing circuit disposed in the processing path between the adaptive equalizer and the timing recovery circuit, wherein the post-processing circuit is configured to modify the output of the adaptive equalizer adaptively at least partially in response to a control from the main receiver processing entity.

16. The apparatus as defined in claim 15, wherein the post-processing circuit is integrated with the main receiver processing entity.

17. A method of constraining tap coefficients in an adaptive Finite Impulse Response (FIR) filter, the method comprising:

effectively adaptively adjusting at least two filter tap coefficients for the FIR filter; and maintaining one or more filter tap coefficients in between the at least two adaptively adjusted filter tap coefficients to be zero or nearly zero regardless of the adjustments to the adaptively adjusted filter tap coefficients;

wherein the FIR filter equalizes an output of an analog-to-digital converter to compensate for impairments in a transmission channel.

18. The method as defined in claim 17, wherein the FIR filter has FIR filter coefficients represented by vector h, wherein: $h = \alpha \cdot [1 \ \sigma \ \beta]^T$, wherein the $\alpha$ and $\beta$ coefficients are adaptively adjusted for the effective adaptive adjustment of the at least two filter tap coefficients, and the $\sigma$ coefficient comprises the one or more filter tap coefficients in between the at least two effectively adaptively adjusted filter tap coefficients.

19. The method as defined in claim 18, wherein the $\sigma$ coefficient has a value of zero.

20. The method as defined in claim 17, wherein the FIR filter has FIR filter coefficients represented by vector h, wherein: $h = \alpha \cdot [1 \ \sigma_1 \ \beta_1 \ \sigma_2 \ \beta_2 \ \sigma_3 \ldots \sigma_m \ \beta_m]^T$, wherein the $\alpha$ and $\beta_x$ coefficients are adaptively adjusted for the effective adaptive adjustment of the at least two filter tap coefficients, and the $\sigma_x$ coefficients comprises the one or more filter tap coefficients in between of the adaptively adjusted filter tap coefficients.

21. The method as defined in claim 20, wherein the $\sigma_x$ coefficients have a value of zero.

22. The method as defined in claim 17, further comprising adaptively adjusting the coefficients according to at least one of a least mean square (LMS) technique, a recursive least squares (RLS) filtering technique, or a Kalman filtering technique.

* * * * *

UNITED STATES PATENT AND TRADEMARK OFFICE
CERTIFICATE OF CORRECTION

PATENT NO. : 7,656,945 B1 Page 1 of 1
APPLICATION NO. : 11/538346
DATED : February 2, 2010
INVENTOR(S) : Warner et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 676 days.

Signed and Sealed this

Twenty-eighth Day of December, 2010

David J. Kappos
*Director of the United States Patent and Trademark Office*